Figure 1:
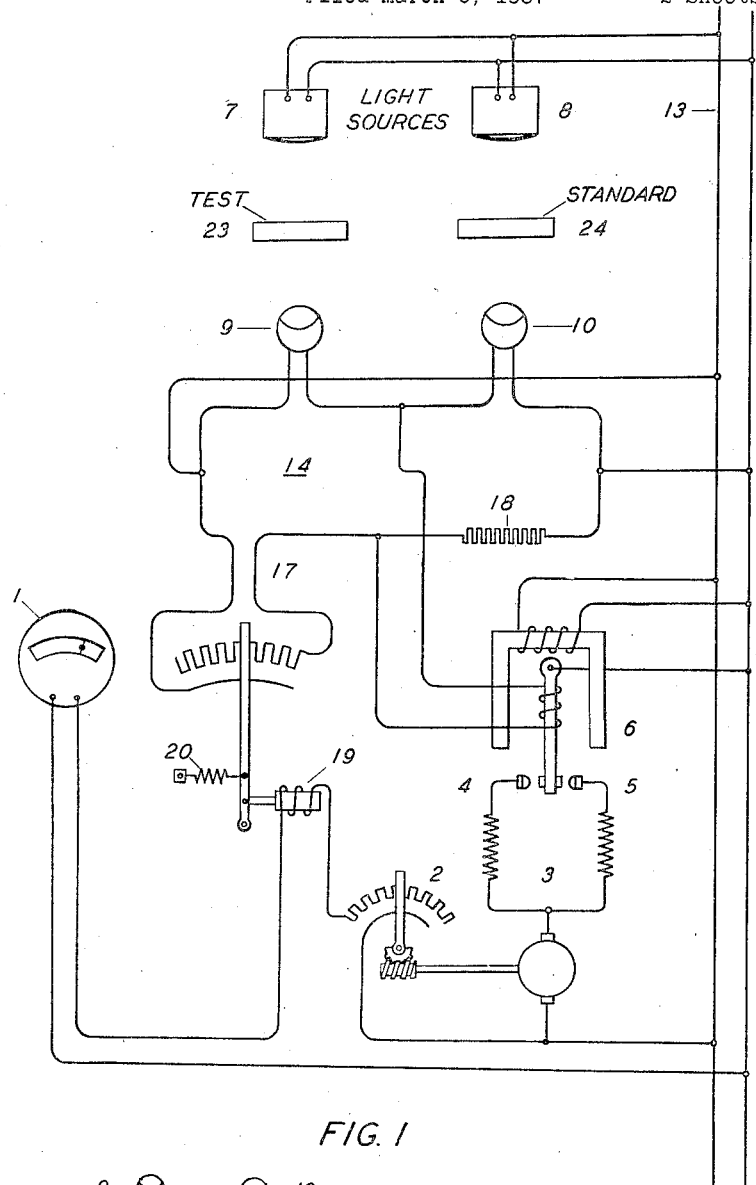

Jan. 31, 1939.    A. S. FITZ GERALD    2,145,591
ELECTRIC INDICATING AND CONTROL SYSTEM
Filed March 6, 1937    2 Sheets-Sheet 1

INVENTOR
Alan S. Fitz Gerald

Patented Jan. 31, 1939

2,145,591

UNITED STATES PATENT OFFICE 2,145,591

ELECTRIC INDICATING AND CONTROL SYSTEM

Alan S. Fitz Gerald, Wynnewood, Pa.

Application March 6, 1937, Serial No. 129,354
In Great Britain January 6, 1933

15 Claims. (Cl. 250—41.5)

This invention relates to electrical control and indicating systems and more particularly to systems in which it is desired to actuate a device, or to give an indication, in accordance with a mathematical function of the magnitudes of a plurality of physical quantities.

For example it is frequently desired to give an indication dependent upon the ratio of two electrical effects. A well known instance where this requirement exists is in cases where an electric current, used as an indicating effect, varies also with fluctuations in the supply voltage. Only when such fluctuations are properly compensated for is the indication correct.

In such circumstances it is usual to employ instruments of the so-called ratio type which embody special structure whereby the position of the pointer is governed by the relative influence of two exciting coils. It is well known, however, that such instruments are subject to the limitation that the operating torque is much lower than that of ordinary meters, and that ratio instruments cannot readily be obtained in graphic or curve-drawing type.

In cases where control, rather than indication, is desired, similar restrictions likewise apply inasmuch as ratio-controlled relays are likewise of special construction and are not available in standard commercial patterns, to the same extent as are relays of simple type operated by a single winding.

It is therefore an object of my invention to provide an automatic electrical regulating circuit by means of which a single electrical quantity is continuously maintained at a numerical value which depends upon a function of two physical quantities.

It is another object of my invention to provide a single electric current which is controlled so as to be related in magnitude to the ratio between two other electric currents whereby a simple current operated relay or meter may be actuated in accordance with said ratio thus avoiding the necessity of specially designed instrument or relay structure.

It is a further object of my invention to provide a single electric current proportional to the ratio between two light intensities.

It is yet another object of my invention to provide a single electrical quantity at all times controlled so as to be related in magnitude to the product of two other physical quantities.

This application is a continuation-in-part of my application Serial Number 700,957 now U. S. Patent 2,074,835 filed December 5, 1933.

According to my invention I provide a bridge circuit having automatic regulating means for maintaining the bridge in a condition of balance. Two of the arms of this bridge circuit consist of impedance elements severally variable in accordance with the magnitude of the two physical quantities the ratio between which constitutes the controlling effect; the third arm is an impedance of constant value; the fourth arm of the bridge comprises an impedance which is automatically varied to maintain the bridge in balance.

The impedance element in the fourth arm of the bridge is variable in accordance with a current, which current is automatically controlled so as to adjust the impedance to the value which causes the bridge to be balanced. The value of this current, so controlled, gives the desired indication, and an instrument or relay energized by this current will be actuated in accordance with the ratio between the two physical quantities.

As an example of the many practical uses to which my invention may be applied the present specification describes arrangements relating to light sensitive apparatus. However, I wish it to be clearly understood that my invention may be used with advantage in connection with any external physical effect capable of directly or indirectly exerting an influence upon an electric circuit, light sensitive apparatus representing a typical example of such effects.

It is well known to these skilled in the art that, due to the characteristics of photo-electric cells, preferred methods for obtaining accurate indications utilize arrangements in which the effect to be indicated or measured is compared with a standard. If it is desired to provide a single direct indication, rather than subsequent comparison of a plurality of observations, means for indicating a ratio between two effects are obviously requisite.

In the arrangement to be described below a single current is provided which gives an indication dependent upon the ratio between two light effects. This current can readily be indicated by a simple type of instrument. Furthermore, if it be desired to transmit the indication over a distance, as may be the case in connection with industrial applications relating to the density of smoke, gases, liquids, or the like, the convenience of a single current indication, as compared with a ratio effect, is evident.

Figure 2:
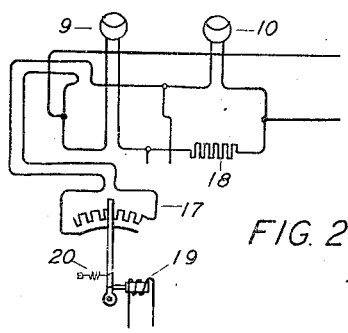
Figure 3:
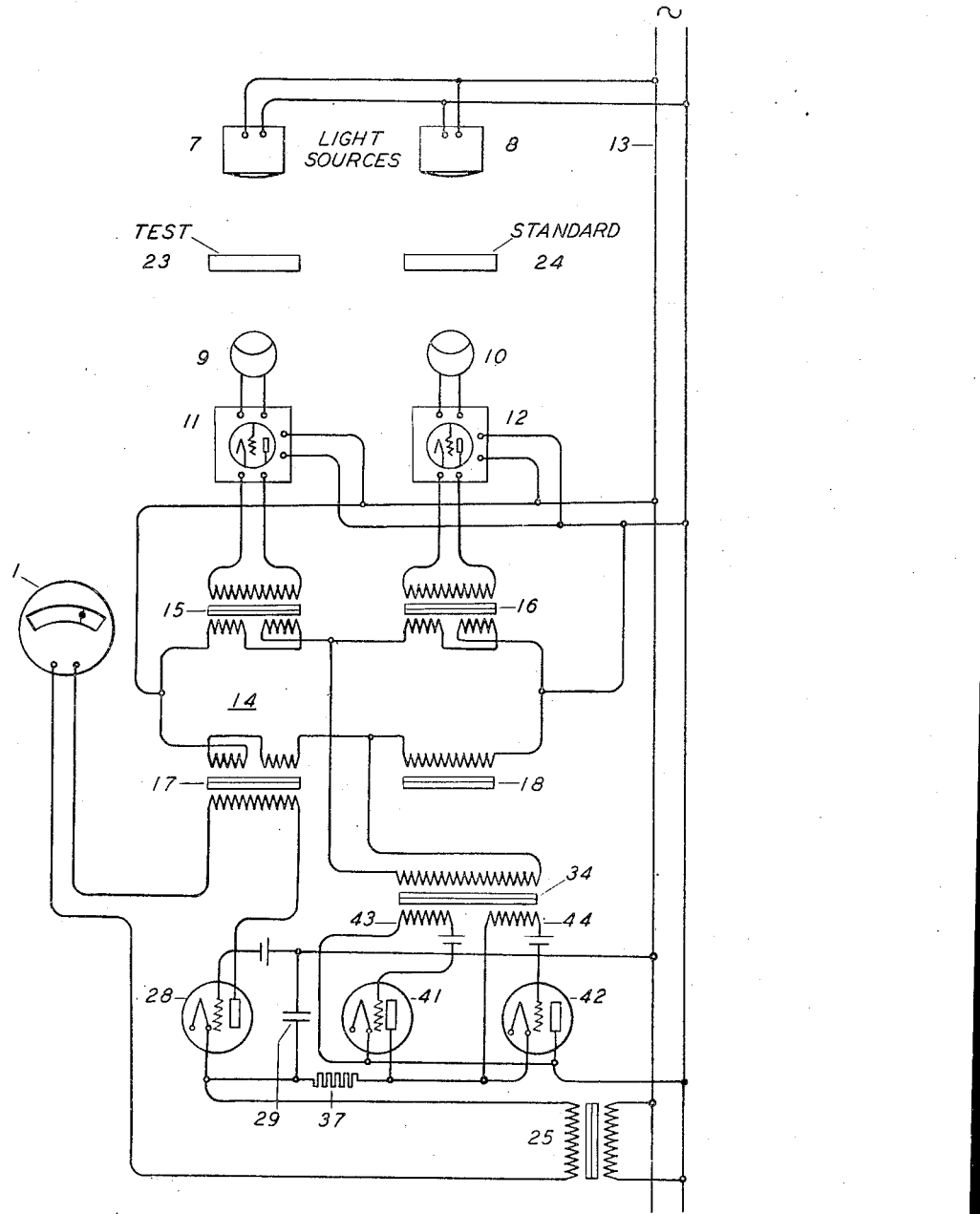

These and other novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which:

Fig. 1 is a schematic electric circuit diagram representing an embodiment of my invention; Fig. 2 is a diagram of a modification of the arrangement shown in Fig. 1, and; Fig. 3 is a diagram of another embodiment of my invention.

Referring to Fig. 1 I show an instrument 1 supplied with current through a rheostat 2 operated by a reversible motor 3. The motor 3, which may be of the split series field type, is energized to operate in either backward or forward direction through contacts 4 and 5 of a polarity-responsive device 6. While I have shown, in Fig. 1, a conventional symbol to illustrate the function to be performed by the device 6, it should be understood that I may employ for this purpose any device capable of responding selectively to energization of reversible polarity or phase in either DC or AC circuits respectively. The arrangement disclosed in my U. S. Patent No. 2,037,312 is particularly suitable for this purpose.

Two light sources 7 and 8 illuminate a pair of photo-electric cells 9 and 10 included in a bridge circuit 14, which, together with the instrument circuit and motor, is energized from a source 13; the latter may be either DC or AC according to the particular type of photo-cells employed. There is also included in the bridge circuit 14 a variable resistance element 17, and a resistance of fixed value 18.

The variable element 17 is controlled by the current flowing in the instrument 1, as regulated by the rheostat 2, and may comprise any variable current device known in the art the conductivity of which may be controlled in accordance with an externally applied current or voltage. I show, in Fig. 1, a conventional symbol schematically representing such a device, as for example a solenoid 19 opposed by a spring 20, whereby the resistance is varied in accordance with the magnitude of the current flowing in the coil of the solenoid.

By means of this arrangement the reading of the instrument 1 will be in accordance with the ratio of the light received respectively by photo-cells 9 and 10 from light sources 7 and 8. Suppose, for example, that the arrangement is used for indicating a light-property of a material as for instance the translucency of a specimen of ceramic or glassware. A test sample 23 of the material is interposed between the light source 7 and photo-cell 9 and light from the source 8 directed upon the photo-cell 10 is caused to pass through a standard piece 24.

Under these conditions, in accordance with the well known principle of the Wheatstone bridge, when the bridge is exactly balanced, that is to say when no out-of-balance voltage is received by the polarity-responsive device 6 which is connected across the equi-potential points of the bridge, the ratio of the resistances of 17 and 18 will be the same as the ratio between the resistances of 9 and 10. If the bridge is not balanced either a positive or a negative voltage will be received by the polarity-responsive device 6 which will close either contact 4 or contact 5 thereby operating the motor 3 in a direction such as will increase or decrease the current flowing in the rheostat 2, the instrument 1, and the solenoid 19; this adjusts the resistance of 17 until the bridge comes into balance whereupon the device 6 opens the contact and the motor 3 is brought to rest. It will be evident that according to this arrangement the action of the polarity-responsive device 6 and motor 3 is at all times automatically to maintain the bridge 14 in a condition of balance.

Since the ratio of 17 to 18 is the same as the ratio of the resistances of 9 and 10, in view of the fact the resistance 18 is of constant value, the numerical value of 17 varies in direct proportion to the ratio between the resistance of photo-cell 9 and photo-cell 10. The automatically regulated current shown by the instruments 1, gives an inverse indication of the resistance of 17 and accordingly its scale can be calibrated so as to show the bridge ratio, that is to say, the ratio between the resistances of the photo-cells 9 and 10. Since the photo-cells 9 and 10 are responsive to the light reaching them, from the light sources 7 and 8, respectively, through the samples of material 23 and 24, it follows that the instrument 1 gives an indication in accordance with the relative transparency of 23 and 24.

Thus if it is desired that the instrument 1 be a control device for the purpose of operating apparatus for sorting or grading samples 23 in accordance with their transparency the instrument 1 may be a simple current operated relay rather than an electro-magnetic ratio device.

It will be apparent to those skilled in the art that if the relative positions of the photo-cell 9 and the resistance 17 be transposed as shown in Fig. 2 the indication of the instrument 1 will vary in accordance with the product of the numerical values of the resistance of 9 and 10 instead of the ratio thereof.

I show in Fig. 3 another arrangement for accomplishing similar objects by means of different instrumentalities in which I employ apparatus having no contacts or moving parts.

In Fig. 3 I show the instrument 1, light sources 7 and 8, photo-cells 9 and 10, test piece 23 and standard sample 24 all arranged as in Fig. 1 and serving similar purposes. The bridge circuit 14 includes three saturating reactors, 15, 16, 17, and an impedance of substantially constant value 18. For the arrangement shown in Fig. 3 the source of power 13 supplies alternating current.

The saturating windings of the reactors 15 and 16 are energized with uni-directional current derived from the photo-electric cells 9 and 10 respectively. Amplifiers 11 and 12 may be interposed between the photo-cells and the saturating reactors if desired. The saturating reactors 15 and 16 are, therefore, variably saturated, respectively, in accordance with the intensity of the light falling upon photo-cells 9 and 10.

A current of adjustable value is caused to flow in the saturating winding of the reactor 17.

A transformer 34 is connected between the junction of reactors 15, 16 and the junction of reactor 17 and fixed impedance 18.

Operation of the bridge circuit 14 is as follows:

Assuming any given relation between the light intensities impinging, respectively, on the photo-cells 9 and 10, the saturating reactors 15 and 16 being correspondingly saturated variably, it will be obvious that by varying the current in the saturating winding of the reactor 17, a condition may be found at which the bridge circuit 14 balances, under which condition transformer 34 will be de-energized.

When the bridge circuit 14 is balanced, the ratio of the reactance of the reactor 17 to that of impedance 18 will be identical with the ratio of the impedances of 15 and 16, respectively. Since 18 is of substantially constant value, the impedance of 17 will be a function of the ratio of the impedance of 15 and 16. It follows, therefore, that there will be a definite relation between the saturating current flowing in 17 when the bridge is balanced, and the ratio of the saturating currents of 15 and 16. Thus, the saturating current in 17, so long as the bridge is balanced, is a measure of the ratio between the saturating currents applied to 15 and 16 and, therefore, an indication of the light intensity ratio.

Accordingly the saturating current in 17, when the bridge is balanced, is dependent upon the transparency of the test sample 23.

I therefore provide means for automatically regulating the saturating current of 17 so as to maintain the bridge 14 in a balanced condition.

For automatically regulating the indicating current, any one of a number of systems well-known to those skilled in the art may be employed. For example, there may be used an arrangement which avoids the use of contacts and moving apparatus such as I have shown in my U. S. Patent No. 1,893,768, Fig. 3, and which forms no part per se of my present invention. This arrangement consists of a balanced bridge circuit and a system of electric valves adapted to control the current in a saturating reactor so as to maintain the bridge in a condition of balance.

According to my preferred system, illustrated in Fig. 3 of the present specification, the saturating winding of the reactor 17 is energized by a transformer 25 in series with an electric valve 28. The grid of the electric valve 28 is excited with the voltage across a capacitor 29. The grid circuit is provided with a suitable negative bias voltage since, with this method of control, the grid should be maintained negative at all times. The capacitor is arranged to be charged, through a high resistor 37, by means of two electric valves 41 and 42 which are reversely connected in parallel so that the capacitor 29 may be charged to either polarity, by means of the transformer 34, from the source 13. The transformer 34 is provided with two secondary windings 43, 44 which are connected to the grids of the valves 41 and 42. The transformer 34 is energized, as shown, across the normally equi-potential points of the bridge circuit 14.

Thus, when the bridge circuit is exactly balanced, the transformer 34 will be de-energized. When the bridge is unbalanced, the transformer 34 will be energized with an alternating voltage which will either be in phase with, or out of phase with, the voltage of the source 13, from which the valves 41 and 42 are energized, according to whether the impedance of the reactor 17 be too high or too low.

For a detailed explanation of the operation of the electric valve control system, reference may be had to my aforesaid U. S. Letters Patent No. 1,893,768. Briefly, when the bridge circuit 14 is in a balanced condition, no voltage is applied to the grids of 41 and 42 and the voltage across the capacitor remains at a constant positive value. When the bridge becomes unbalanced, the action of valves 41, 42 modifies the charge of the capacitor 29, increasing or decreasing the voltage across 29, as may be necessary, until the saturating current supplied by electric valve 28 to the saturating reactor 17 is adjusted to such a value that the bridge is again balanced.

If desired the saturating reactors 15, 16 and 17 may be connected in the bridge circuit 14 through suitable filters to eliminate undesired harmonics.

While I have shown in Fig. 3 an automatically regulated bridge circuit comprising saturating reactors I wish it to be clearly understood that the elements 15, 16 and 17 may consist of any other suitable variable impedance devices without departing from the spirit of my invention. It will be understood that the term "variable impedance device" wherever employed in the present specification and claims is intended to signify any device wherein the electrical resistance and/or reactance is variable in accordance with a controlling effect.

Although I have chosen a particular embodiment of my invention for the purpose of explanation, many modifications thereof will be apparent to those skilled in the art to which it pertains. My invention, therefore, is not to be limited except insofar as is necessitated by the prior art and the spirit of the appended claims.

What I claim as new and desire to secure by Letters Patent of the United States is:

1. In an electric system, means for producing a variable effect, electro-responsive apparatus actuated by said effect and furnishing a plurality of electric currents having a ratio therebetween which varies in accordance with said variable effect, a bridge circuit including a plurality of variable impedance elements controlled by said currents, a variable impedance device controlled by a further electric current and an impedance of substantially constant value, means for automatically varying said last-mentioned current so as to maintain said bridge in a condition of balance, and means, controlled by said last-mentioned current, for giving an indication in accordance with the ratio of said first-mentioned electric currents.

2. In an electric system, means for producing a variable effect, electro-responsive apparatus actuated by said effect and furnishing a plurality of electric currents having a ratio therebetween which varies in accordance with said variable effect, a bridge circuit including a plurality of saturable core devices saturated in accordance with said currents, a saturable core device saturated in accordance with a further electric current and an impedance of substantially constant value, means for automatically varying said last-mentioned current so as to maintain said bridge in a condition of balance, and means, controlled by said last-mentioned current, for giving an indication in accordance with the ratio of said first-mentioned electric currents.

3. In an electric system, means for producing a variable effect, electro-responsive apparatus actuated by said effect and furnishing a plurality of electric currents having a ratio therebetween which varies in accordance with said variable effect, a bridge circuit including a plurality of variable impedance elements controlled by said currents, a variable impedance device controlled by a further electric current and an impedance of substantially constant value, means for automatically varying said last-mentioned current so as to maintain said bridge in a predetermined condition, and means, controlled by said last-mentioned current, for giving an indication in accordance with the ratio of said first-mentioned electric currents.

4. In an electric system, means for producing a variable effect, electro-responsive apparatus actuated by said effect for furnishing a plurality of electric currents variable in accordance with said variable effect, a bridge circuit including a plurality of variable impedance devices controlled by said currents, a variable impedance device controlled by a further electric current, and an element of substantially constant impedance, together with means for automatically varying said last mentioned current so as to maintain said bridge in a condition of balance, and means, controlled by said last mentioned current, for giving an indication in accordance with a function of the values of said first-mentioned electric currents.

5. In an electric system, means for producing a variable effect, electro-responsive apparatus actuated by said effect for furnishing a plurality of electric currents variable in accordance with said variable effect, a bridge circuit including a plurality of saturable core devices controlled by said currents, a saturable core device controlled by a further electric current, and an impedance of substantially constant value, together with means for automatically varying said last-mentioned current so as to maintain said bridge in a condition of balance, and means, controlled by said last-mentioned current, for giving an indication in accordance with a function of the values of said first-mentioned electric currents 6. In an electric system, means for producing a plurality of variable light effects, means for producing a plurality of photo-electric currents variable in accordance with said variable effects, a bridge circuit including a plurality of variable impedance devices controlled by said currents, a variable impedance device controlled by a further electric current, and an element of substantially constant impedance, means for automatically varying said last-mentioned current so as to maintain said bridge in a condition of balance, and means, controlled by said last mentioned current, for giving an indication in accordance with a function of the intensities of said light effects.

7. In an electric system, means for producing two electrical quantities, means for relatively varying said quantities, and means for actuating an electrical device with an electrical quantity proportional to the ratio between said variable quantities, comprising an electrical bridge circuit having two adjacent arms the impedance of which is variable in accordance with the said variable quantities, a third arm comprising a fixed impedance element and a fourth arm comprising a variable impedance element, together with means connected across the diagonal of the bridge between the junction of the first and second arms and the junction of the third and fourth arms for furnishing an electrical quantity to control the variable impedance of the fourth arm so as to maintain the bridge in balance, and means connecting the electrical device to be actuated by the electrical quantity thus obtained.

8. In an electric system, means for producing a plurality of variable light effects, and a bridge circuit comprising a first variable impedance device, a second variable impedance device, and a third variable impedance device, said devices comprising three arms of said bridge circuit, the fourth arm comprising an impedance of substantially constant value, means for causing the impedance of said first and second devices to be varied in accordance with said variable light effects, means for automatically varying said third variable impedance device so as to maintain the bridge circuit in a condition of balance, and means, controlled by said last mentioned means, for giving an indication in accordance with a function of the intensities of said light effects.

9. In an electric system, means for producing a plurality of variable light effects, a plurality of photo-electric devices responsive to said variable light effects, said photo-electric devices being effectively included in separate arms of a bridge circuit the other two arms of which comprise an impedance of substantially constant value and a variable impedance device, means for automatically varying the impedance of said last mentioned device so as to maintain said bridge circuit in a condition of balance, and means, controlled by said last mentioned means, for giving an indication in accordance with the ratio between the activation of said photo-electric devices.

10. A self-balancing bridge circuit comprising, a first variable impedance device, a second variable impedance device, and a third variable impedance device, said devices comprising three arms of said bridge circuit, the fourth arm comprising an impedance of substantially constant value, means, controlled in accordance with an out-of-balance effect derived from said bridge, for varying the impedance of said third device so as automatically to maintain the bridge in a condition of balance, together with means, independent of said last mentioned means, for varying the impedance of said first and said second device.

11. In an electrical system, means for producing a plurality of variable physical effects, a plurality of variable circuit elements, means whereby said physical effects severally cause a variation in an electrical characteristic of said circuit elements, a bridge circuit, said circuit elements being effectively included in separate arms of said bridge circuit, another arm of said bridge including a circuit element having a substantially constant electrical characteristic, a further arm of said bridge including another of said variable circuit elements, means responsive to the condition of balance of said bridge for varying another of said physical effects, means whereby an electrical characteristic of said last-mentioned variable circuit element is caused to vary in accordance with said last-mentioned physical effect, and means responsive to said last-mentioned physical effect for giving an indication in accordance with a mathematical function of a plurality of said physical effects.

12. In an electrical system, means for producing a plurality of variable physical effects, a plurality of variable circuit elements, means whereby said physical effects severally cause a variation in an electrical characteristic of said circuit elements, a bridge circuit, said circuit elements being effectively included in separate arms of said bridge circuit, another arm of said bridge including a circuit element having a substantially constant electrical characteristic, a further arm of said bridge including another of said variable circuit elements, means for producing an electric current, means responsive to the condition of balance of said bridge for varying said current, means whereby an electrical characteristic of said last-mentioned variable circuit element is caused to vary in accordance with said current, and means controlled by said current for giving an indication in accordance with a mathematical function of a plurality of said physical effects.

13. In an electrical system, means for producing a plurality of variable physical effects, a plurality of variable circuit elements, means whereby said physical effects severally cause a variation in an electrical characteristic of said circuit elements, a bridge circuit, said circuit elements being effectively included in separate arms of said bridge circuit, another arm of said bridge including a circuit element having a substantially constant electrical characteristic, a further arm of said bridge including another of said variable circuit elements, means for producing an electrical effect, means responsive to the condition of balance of said bridge for varying said electrical effect, means whereby an electrical characteristic of said last-mentioned variable circuit element is caused to vary in accordance with said electrical effect so as to maintain said bridge in a balanced condition, and means controlled by said electrical effect for giving an indication in accordance with the ratio between two of said physical effects.

14. In an electrical system, means for producing two variable physical effects, a first variable impedance device and a second variable impedance device, means whereby said physical effects severally cause a variation in the impedance of said devices, an impedance of substantially constant value, a third variable impedance device, means for determining when the ratio between the impedance of said first and second devices is the same as the ratio between said constant impedance and said third variable impedance device, means for producing an electric current, means for varying the impedance of said third-mentioned device in accordance with said current, means responsive to said determining means for varying said current, so as to maintain said impedance ratio condition, and means controlled by said current for giving an indication in accordance with the ratio between said two physical effects.

15. In an electrical system, means for producing two variable physical effects, a first variable impedance device and a second variable impedance device, means whereby said physical effects severally cause a variation in the impedance of said devices, an impedance of substantially constant value, a third variable impedance device, means responsive to a predetermined relation between said four impedances, means for producing an electric current, means for varying the impedance of said third mentioned device in accordance with said current, means controlled by said responsive means for varying said current so as to maintain said predetermined relation, and means controlled by said current for giving an indication in accordance with a function of the magnitudes of said two physical effects.

ALAN S. FITZ GERALD.